United States Patent [19]

Carlson

[11] 4,205,926
[45] Jun. 3, 1980

[54] SUCKER ROD AND COUPLING THEREFOR

[76] Inventor: Drexel T. Carlson, 2909 W. 93rd St. Terr., Leawood, Kans. 66206

[21] Appl. No.: 824,481

[22] Filed: Aug. 15, 1977

[51] Int. Cl.² ............................................. E21B 17/00
[52] U.S. Cl. .................................... 403/266; 403/275; 403/343; 403/305; 166/68
[58] Field of Search ................. 52/230; 403/343, 305, 403/266, 275, 369; 166/242, 68; 428/377; 156/180, 172; 29/452

[56] References Cited

U.S. PATENT DOCUMENTS

| 196,235 | 10/1877 | Knapp | 403/275 X |
|---|---|---|---|
| 499,954 | 6/1893 | Black | 403/369 |
| 889,776 | 6/1908 | Dyer | 403/305 |
| 985,915 | 3/1911 | Marchand, Jr. | 403/275 |
| 2,294,398 | 9/1942 | Ferguson | 29/452 UX |
| 2,346,426 | 4/1944 | Hait | 403/343 X |
| 2,453,079 | 11/1948 | Rossmann | 52/223 R |
| 2,652,231 | 9/1953 | Smith | 403/184 X |
| 2,690,934 | 10/1954 | Holcombe | 403/307 X |
| 3,378,630 | 4/1968 | Mendelsohn et al. | 428/377 X |
| 3,486,557 | 12/1969 | Harrison | 52/727 X |
| 4,063,838 | 12/1977 | Michael | 156/180 X |

Primary Examiner—Andrew V. Kundrat
Attorney, Agent, or Firm—Thomas M. Scofield

[57] ABSTRACT

Improvements in sucker rods for oil wells and couplings therefor; light weight and electrically insulating sucker rods and couplings; fiberglass windings, resin impregnated, for sucker rods and sucker rod couplings; strand-cable type sucker rods with compression sheath windings thereon of resin impregnated fiberglass.

48 Claims, 27 Drawing Figures

SUCKER ROD AND COUPLING THEREFOR

BACKGROUND OF THE INVENTION

Sucker rods normally come in 25 foot sections. Most conventional prior art sucker rods are simply solid rod stock with two male or male and female fittings at their ends. A single sucker rod, thus, according to this prior art, is simply an elongate solid rod having integral male fittings at both ends or one such and a female fitting at the other end. At the well site, these are joined, section by section, via couplings or the male and female fittings, to form a rod of great length sufficient to reach the length of the well casing and operate a pump at the bottom of the well. In oil wells, this pump reciprocates at the bottom of the well casing to force oil up the casing to the well head. A sucker rod assembly thus is an operating rod connected at its lower extremity to the pump element and, at its upper end, to the power motor and drive for the pump.

One problem well known to the art is that such sucker rods become so long in length that they stretch longitudinally and get out of synchronization with the reciprocation of the pump. Since some wells are 20,000 feet or more in depth, the sucker rod employed therewith is long indeed. In deep wells, the cumulative weight of the aggregate connected sucker rod elements becomes so great that different strength (and diameter) rods are required at different portions along the length of the rod in order to sustain the weight.

As may be seen from the prior art recited below, various solutions have been attempted to the problem of optimum sucker rod structure, function and design. These include the conventional solid rods, cable type or wire-including rods and pre-tensioned assemblies with sucker rod elements of various sorts. With respect to the latter, it is known to assemble a sucker rod having two main components, specifically, an outer compression tube and inner tension member which, when properly assembled, limit elongation of the device within certain load parameters and provide greater load carrying ability.

Another, but related problem is the question of electrical conductivity between elements of the sucker rod. This problem has at least two facets, specifically, first, the prevention of conductance between the sucker rods or sucker rod elements themselves and, secondly, the minimizing of conductive contact between the elements of the sucker rod chain and the well casing or well hole. Various attempts have been made in the prior art to deal with this problem.

BRIEF DESCRIPTION OF THE INVENTION

The subject improvements are directed to cooperating elements of a sucker rod chain (sucker rods, per se and the couplings therefor) which operate to solve, in combination, the above problems common to prior art sucker rod and coupling constructions. A first improvement is that both the couplings and the lengths of the cables of the sucker rod elements here disclosed are both sheathed in nonconductive material. The coupling itself has a nonconductive element spacing the ends of the metal portions of the sucker rods being connected, metal elements for engagement therewith and nonconductive sheathing for the metal elements. A complete current break is thus provided.

More specifically, with respect to the improved coupling construction, there is first provided a central nonconductive or plastic plug having a cylindrical center portion of greatest outer diameter, with two externally threaded ends on each side thereof. There are additionally provided two internally threaded metal sleeves having knurled external surfaces, the sleeves threadably engageable one on each end of the central plug. The outer diameters of the sleeves taper centrally from a lesser outer diameter to a greater outer diameter. Once the assembly is completed (the named sleeves threaded onto the central plug), the entire assembly is wrapped with fiberglass fabric impregnated with polyester resin which adheres, when set up, to the knurled steel surfaces of the sleeves. The basic purpose of the central plastic is not to provide any strength, although it preferably is fiberglass reinforced. Rather it is to insulate the two steel sleeves from one another and align them for the wrapping process. Further, when sucker rod male ends are threaded onto the steel sleeves they abut against the plastic plug ends, creating a lock nut effect.

The particular sucker rod construction of the instant invention comprises an improvement over the known cable type sucker rod constructions, both with respect to the manner of connecting the cable length to its end fittings, but also with respect to prestressing. The outer element of the sucker rod which comprises, when the sucker rod is completed, the compression element, is a resin impregnated fiberglas wrap of helical character which not only is of light weight and great strength, but also of electrically insulating character. It is an improvement over all known sucker rod constructions with respect to its unique light weight which derives from its collar-elongate metallic element base structure which in turn lends itself to the compression element sheathing between the collars.

Specifically, this sucker rod preferably comprises:

(1) An elongate central strand, typically 25 feet in length (a strand being a cable-like structure having a straight central wire with like wires wrapped therearound) or other strong metallic element of relatively small outer diameter;

(2) A pair of end pieces of steel, one on each end of the strand, each having a tapered passageway therethrough to receive therewithin the upper and lower ends of the strand, there being wedges or a sleeve received on the outside of or centerwire of the strand thus to wedge or lock the ends of the strand into the end pieces; and (3) A helical winding of glass fiber or filament which is polyester resin wetted applied around the strand between the end pieces (after the strand has been put into tension) and also partly over the end pieces.

The process of manufacture of the subject pre-tensioned sucker rod comprises:

(1) The end pieces receive the respective ends of the strand, the latter being pushed through each of them in such manner that the strand ends project sufficiently that the tapered wedges or sleeves can be inserted on or in the strand end portions;

(2) After this, the ends pieces are moved outwardly, away from one another and wedged onto the ends of the strand;

(3) Thereafter, the sucker rod end pieces are placed under pull so that the strand is, typically, under tension of many thousands of pounds; (or at least sufficient tension to maintain the strand taut while it is being wound)

(4) Glass fiber or filament having wet polyester resin thereon is then helically wound to and fro along the length of this strand between the two end pieces onto the pre-tensioned strand and also onto the inboard ends of the end pieces;

(5) After the wrap is set up, tension is released upon the strand and the outer ends of the tapering passages through the sucker rod end pieces are plugged with metal-filled epoxy resin to encapsulate the wedge means and strand ends inside the end pieces for corrosion protection (or like other material).

THE PRIOR ART

The American Petroleum Institute, Division of Production, 300 Corrigan Tower Building, Dallas, Texas 75201 issues specifications for sucker rods and their couplings and subcouplings. Thus, for example, see Sections 1 (Scope), 2 (Material), 3 (General Dimensions), 4 (Couplings And Subcouplings) and 5 (Shouldered Connections For API Std 11 B (17th Edition)) January 1970 (Specification For Sucker Rods), as well as the supplements thereto.

Applicant is aware of the following U.S. Pat. Nos. directed to prestressed sucker rods, drill stems, drill collar handling subs and tubes and rods:

Rossmann 2,453,079 "Prestressed Sucker Rod", issued Nov. 2, 1948;

Guldenzoph, et al 2,959,193 "Prestressed Drill Stem", issued Nov. 8, 1960;

Oakes 3,015,512 "Drill Collar Handling Sub", issued Jan. 2, 1962; and

Hollander 3,232,638 "Prestressed Tubes and Rods", issued Feb. 1, 1966.

Applicant is aware of the following Patents directed to sucker rods wherein a cable is employed therewith:

851,118, Chadwick, issued Apr. 23, 1907 for "Sucker Rod";

Smith 2,652,231 "Pumping Assembly", issued Sept. 15, 1953;

Brown 3,212,582, issued Oct. 19, 1965 for "Plastic Drill Pipes And Sucker Rods For Oil Wells"; and Harrison 3,486,557, issued Dec. 30, 1969 for "Sucker Rod".

Applicant is aware of the following Patents directed to pump and sucker rod couplings:

Kemp 1,067,819, issued July 22, 1913 for "Pump Rod Coupling";

Kinney 2,049,265 "Sucker Rod Coupling", issued July 28, 1936; and

Holcombe 2,690,934, issued Oct. 5, 1954 for "Insulated Sucker Rod And Tubing . . . ".

The following Patents disclose pin-pin couplings or coupling devices which additionally may be associated with box coupling or connecting devices:

Knapp 196,235 "Lightning Rod", issued Oct. 16, 1877;

Dyer 889,776 "Trolley Wire Splicer" issued June 2, 1908;

Schwarz 1,941,113 "Terminal For Wire Cables", issued Dec. 26, 1933;

Kratoville 2,339,488 "Connector", issued Jan. 18, 1944; and

Scheffler 3,368,271 "Method Of Making A Two-Piece Billiard Cue", issued Feb. 13, 1968.

The use of a plastic compression member or separater in a coupling for metal shafts is seen in Hornschuch 2,679,414 "Separator For Shafts", issued May 25, 1954.

The Patent to DeRidder 3,406,443, issued Oct. 22, 1968 "Method Of Providing An Enlarged End . . . " shows, in FIGS. 1 and 2 thereof, pin-pin and box-box couplings of conventional type joining sucker rods having pin ends and box ends.

Applicant is aware of the following U.S. Pat. Nos. directed to wrapping of cables or wires with resin impregnated materials and filaments:

Finlayson et al 2,377,335 "Structural Material", issued June 5, 1945;

Mendelsohn et al 3,378,630 "Pressure Sensitive Thermo-Setting Resinous Adhesives And Tapes", issued Apr. 16, 1968;

Young 3,429,758, issued Feb. 25, 1969 "Method Of Making Filament Wound Structural Columns";

Andreassen 3,591,433 "Method Of Impregnating A Tape . . . ", issued July 6, 1971; and Whittington 3,762,982, issued Oct. 2, 1973 for "Protective Wrapping For Elongated Member".

OBJECTS OF THE INVENTION

A first object of the invention is to provide new, novel and improved coupling and sucker rod elements adapted to cooperate in a sucker rod chain in new and novel manners, whereby not only is the required weight of a given length of sucker rod greatly reduced, but electrical conductivity is minimized or prevented within the chain.

Another object is to provide an improved multi-part sucker rod assembly.

Another object of the invention is to provide improvements in cable type sucker rods, specifically with respect to (1) the use of strand type cable, (2) the use of novel end piece wedging and connection means and (3) the use of a novel type cable wrap which provides not only an outer member capable of compression, but also electrical insulation.

Another object of the invention is to provide improved sucker rod coupling means adapted to connect two pin-pin ends wherein not only is metal-metal connection to the pin ends retained, but electrical conductivity between the connected sucker rods is prevented or obviated, as well as electrically conducting contact of the coupling element with the wall casing or wall.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIGS. 21-23, inclusive show one form of wedging element useable in the collar constructions of FIGS. 18-20, inclusive.

FIGS. 24-27, inclusive are views of an alternative wedging gripping structure useable with the collars seen in FIGS. 18-20, inclusive.

STRUCTURE AND FUNCTION

Figures 1, 2, 3:
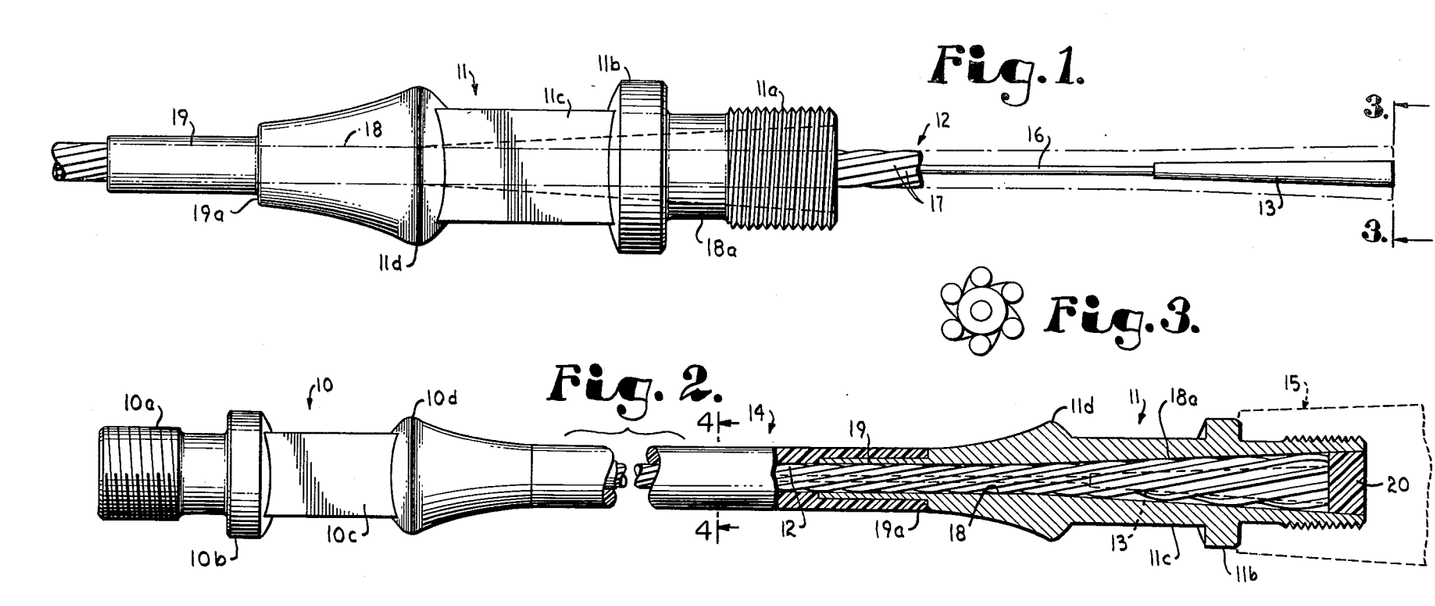
FIG. 1 is a side view of one male or pin sucker rod end piece with a cable strand inserted therethrough and a tapered wedge inserted in the end of the strand to expand it, prior to the strand being pulled to the left in the view to seat the strand in the tapered passageway of the end piece.
FIG. 2 is a side view of the sucker rod assembly with the right hand end piece in the view sectioned to illustrate the inner structure of the end piece and, as well, show the seating of the strand having the tapered wedge therein in the tapered passageway of the end piece. The sealing closure of the assembly is also shown. (This sucker rod is shown as using two male or pin end pieces.)
FIG. 3 is a view taken along the line 3—3 of FIG. 1 in the direction of the arrows, showing the tapered wedge expanding the end portion of the strand.

Referring first to the sucker rod construction seen in FIGS. 1-3, inclusive, this construction, as illustrated, is made up of the following parts: a pair of collars generally designated 10 and 11, an elongate metallic element 12, generally designated, here shown as a strand of structure to be described, a pair of elongate tapered sleeves generally designated 13 received on the center wire of the two ends of the strand and a fiberglass filament winding, resin reinforced, generally designated 14, wound upon the elongate metallic element 12 between collars 10 and 11 and also wound over the opposed adjacent ends of the collars 10 and 11. In a chain of such sucker rods or sucker rod assemblies, connected one to the other, a plurality of couplings generally designated 15 and preferably of the structure seen in FIGS. 6-10, inclusive are employed, one typical such coupling seen to the right (in dotted lines) in FIG. 2. The fiberglass filament winding acts as a compression sheath, to be described.

Referring first to strand 12, that specifically illustrated is an Armco high strength (270) Tufwire strand of ⅜ inch nominal diameter with an elongation of 0.0072 inches per inch or approximately 2.14 inches overall with a starting length of the strand being 24 feet 7 and ⅞ inches. The strand structure illustrated comprises a central wire 16, which is straight, upon which are wound six outer wires 17.

The collars 10 and 11 have an outer configuration largely the same as a conventional sucker rod pin end. Specifically, collar 11 has externally threaded end 11a, a circumferential semi-cylindrical flange 11b, wrench flat portion 11c and tapered enlarged shoulder 11d. These parts and portions serve the same functions as the like parts of a conventional sucker rod pin end. Thus, for example, when a sucker rod is suspended it is suspended from shoulder 11d. The wrench flat portion is for engagement of suitable wrenches for turning the sucker rod assembly. Flange 11b limits the inboard travel of a coupling threaded on the collar.

With respect to a sucker rod assembly or collar thereof illustrated in the Figures, "inboard" refers to the direction towards the center of the assembly or strand and "outboard" refers to the free ends of the strand or collars thereon.

Collar 11 differs from the pin ends of conventional sucker rods by having a cylindrical passageway 18 through the inboard side of or end of the coupling, this passageway tapering to a greater inner diameter in the outboard or free end portion of the collar as at 18a. Additionally, there is provided an integral, hollow, cylindrical sleeve 19 extending from the inboard end of the enlarged tapered shoulder 11d of collar 19. The passage 18 extends through sleeve 19.

The elongate tapered sleeve 13 comprises a frustoconical metal member having a cylindrical opening (FIG. 3) therethrough adapted to be fitted over the center wire 16 of strand 12, sleeve 13 so spreads outer wires 17 of the strand (FIG. 3) that, when the cable or strand 12 is pulled from right to left in the view of FIG. 1 (with sleeve 13 mounted as described and shown), the end of the strand will be wedged in the tapered passageway portion 18a as seen in FIG. 2, to the right in the view. The ends of strand 12 are wedged into the tapered passageways in the collars to make an initial connection and securement between the collars and the strand prior to (1) wrapping the compression sheath (to be described) on the strand between the collars and on the collar ends 19 and (2) weather plugging the ends of the collars as seen at 20 to the right in FIG. 2. The taper of sleeve 13 should be the same as the taper of passageway 18a and its length preferably at least seven times the strand outer diameter.

Assuming the collars 10 and 11 wedged or snubbed on the ends of the strand in the manner seen in FIG. 2, the sucker rod assembly of strand with end collars wedged thereon is ready for tensioning of the strand between the collars and wrapping of the filament on the strand and inboard ends of the collars. Typically, the externally threaded pin ends of the collars 10 and 11 are threaded into suitable connector elements upon which tension may be exerted. The strand is tensioned at least to the degree that it will be straight between collars 10 and 11 in order that the helical wound glass filament will be uniformly and evenly wrapped thereon. Alternatively, the tension exerted on the strand may be up to a significant percentage of the strand's ultimate tensile strength as will be discussed below. Once the tensioning of the strand between the collars has been effected to the desired degree, a glass fiber filament, polyester resin wetted or reinforced is wrapped in a compression sheath the full length of the strand between the collars and also upon the sleeve extensions of the collars as in the case of extension 19 on collar 11. This is accomplished by first wrapping the filament on the tensioned strand between the sleeves of the collars 10 and 11 until the filament buildup equals the wall thickness of the sleeves. Thereafter, the winding is extended over the surfaces of the sleeves on the collars as seen in FIG. 2 up to and against the walls 19a defined between the shoulders (11d) and sleeves (19).

Figure 4:
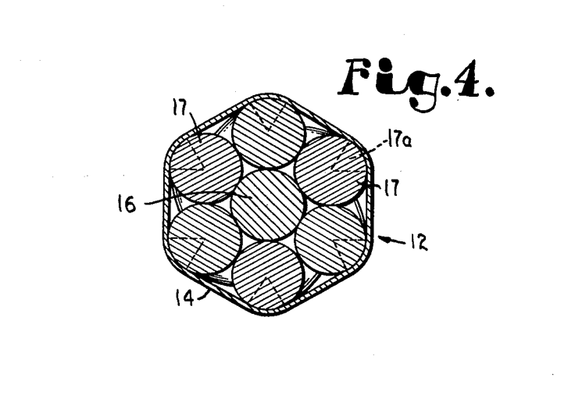
FIG. 4 is a view taken along the line 4—4 of FIG. 2 in the direction of the arrows, the strand, however, shown in a first stage of wrapping of the fiberglass thereon.

FIG. 4 shows strand 12 and wires 16 and 17 with the first layers of wrap thereon. The contact and bonding areas of the individual wires 17 with the filament are illustrated in the zones 17a which are approximately 60 degree total arcs of the 360 degree wire surfaces. Once the resin has set and the compression sheath has assumed its solid, final form, the tension on the collars and strand may be released. Thereafter, the ends may be plugged for corrosion protection with metal filled epoxy or polyester resin in order to encapsulate the "fanned out" individual strand wires 17 and the tapered wedge 13. At this point, the sucker rod assembly or construction is ready for use.

Typically, in extreme tensioning of the strand or cable, the tension will be brought up to ½ the yield point of the strand for wrapping the filament thereon. Then, when the compression sheath has cured, there will be a balance between tension of the strand and compression of the sheath. The zone of compression of the sheath takes place between the inboard ends of the sleeves and the walls at the inboard end of shoulder portions of the collars next the outboard ends of the sleeves. It is also taken up in the sheath to wire contact as seen in zones 17a of FIG. 4 along the entire length of the strand between the inboard ends of the sleeves such as 19.

Figure 5:
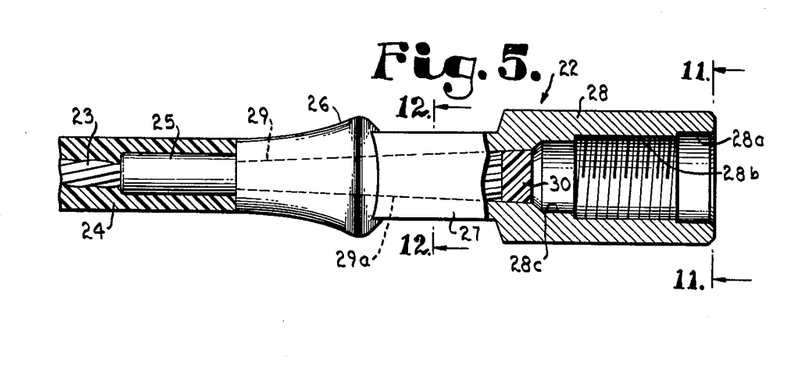
FIG. 5 is a side, partially sectioned view of a female or box end piece useable in the improved sucker rod construction.
Figure 6:
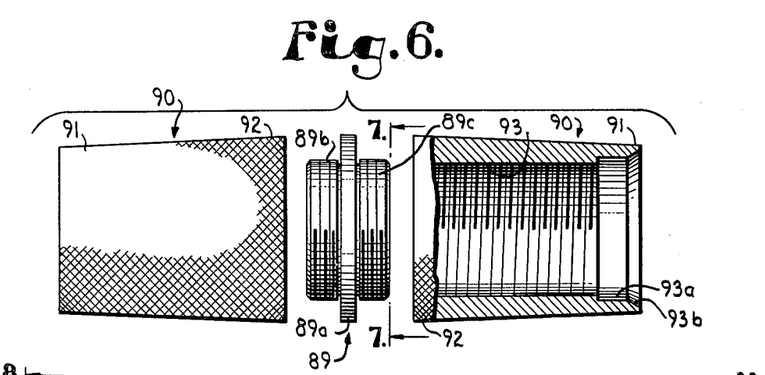
FIG. 6 is an exploded view of the subject improved coupling construction showing the two tapered sleeves of metal positioned on each side of the central insulating or plastic spacer, the sleeve on the right sectioned to show the internal construction thereof.

FIG. 5

Referring to FIG. 5, therein is shown an alternative collar structure for use in the sucker rod assembly. Specifically, this comprises a box end collar adapted to be directly connected to a pin end collar without use of a coupling therebetween.

In this case, the collar element is generally designated 22, the strand cable element 23 and the compression sheath or sleeve 24. Collar 22 has inboard sleeve end 25 with outwardly tapered shoulder 26 connected and adjacent thereto, wrench flat portion 27 and internally threaded box end 28. Cylindrical passage 29 through sleeve 25 in the inboard portion of the tapered shoulder 26 gives way to tapered greater diameter portion 29a of the passageway. The latter serves the same purpose as the tapered passageway portion 18a in FIGS. 1 and 3, specifically, to provide a wedging surface when a tapered sleeve (like sleeve 13 in FIGS. 1 and 3) in received within the strand on the central wire or portion thereof, spreading the peripheral wraparound wires thereof apart as in FIG. 3.

After the device of FIG. 5 has been assembled on the strand, with the strand tensioned between the collar 22, with a pin type collar (like collar 10 or 11 of FIGS. 1 and 3) on the other end of the strand, the compression sheath wrap 24 is applied to the strand and the inboard sleeve portions of the collars on the strand. Once the sheath 24 has cured and set, the ends of the strand in the collars may be plugged as at 20 in FIG. 3 and 30 in FIG. 5.

Once again, as stated with respect to the pin type collars of FIGS. 1 and 3, the external configurations of the collars are substantially that of standard box ends or pin ends on standard sucker rods. The difference, with respect to the structure of FIG. 5, lies in the provision of the tapered and cylindrical passageways 29a, 29 through the collar and the provision of the cylindrical sleeve 25, through which the passage 29 also passes for receipt of the strand end therethrough. The internal configuration of the threaded zone of the box end type collar of FIG. 5 at 28a (greater diameter entry portion), 28b (internally threaded portion) and 28c (lesser diameter inboard portion) is equivalent to such structure in conventional sucker rod box ends. The outboard end of tapered passageway 29a is axial with and leads into the lesser diameter portion 28c. Thus, in the assembly of the device of FIG. 5, the strand end is thrust completely through the collar 22 (in the manner seen in FIG. 1 with respect to a pin end type collar) for insertion of the tapered sleeve into the strand. Thereafter, the strand is pulled to the left in the view of FIG. 5 in the manner of assembly of the device of FIGS. 1-3 until the portion of the strand having the tapered sleeve therein is wedged into the tapered passageway portion 29a.

Figure 15:
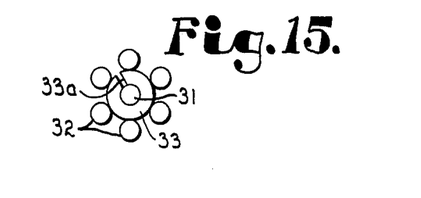
FIG. 15 is an end view of a seven wire strand having a modified tapered sleeve associated therewith, this view like the view of FIG. 3.
Figure 16:
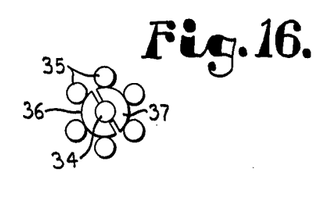
FIG. 16 is an end view of another seven wire strand having a tapered sleeve associated therewith in the manner of FIG. 3, the sleeve shown being a second modification.

FIGS. 15 AND 16

Referring to FIG. 15, therein is shown an end view of a strand (here shown as having a center wire 31 and six peripheral wraparound wires 32) without which is mounted or received on center wire 31 a modified form of tapered sleeve 33. This view should be compared with the view of FIG. 3. Sleeve 33 is the same as sleeve 13 seen in FIGS. 1-3, inclusive, save for the fact that there is provided a slit 33a along the entire length of the sleeve through one side thereof. By providing the slit 33a in the wall of sleeve 33, the length thereof, axially oriented, this permits sleeve 33 to be compressed upon center wire 31 of the strand when the cable or strand is wedged into the tapered passageway 18a of the sleeve of FIGS. 1 and 3 (to the right in the latter) or in a box end collar as in FIG. 5. This gives additional securement of the strand within the collar in which it is wedged because all of the end elements of the strand are wedged with respect to the tapering wall of the passageway in which the strand is received in the collar; the outer wires, the tapered sleeve on the inner wire and the inner wire itself.

FIG. 16 shows a modification of the last described idea where, with respect to a strand having center wire 34 and peripheral wraparound wires 35, the tapered sleeve fitted on the inner wire and inside of the outer wires is made up of two parts (identical halves) 36 and 37. This structure is quite similar to the constructions of FIGS. 21-23, inclusive or 24-27, inclusive, to be described, being paired wedge elements, but without requiring (although not ruling out) the internal configuring or knurling of those structures. The latter mentioned structures of the two sets of Figures are designed to grasp the outside of a cable or strand, but are similar in configuration to a two part sleeve as seen in FIG. 16.

Again, the purpose of the structure of FIG. 16 is to provide a tapered sleeve having wedging characteristics with respect to the center wire, 34, as well as outer wires 35 in the tapered passageways of the pin or box collars.

Figure 17:
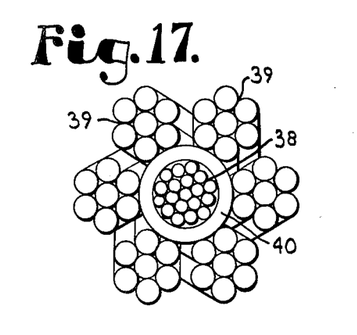
FIG. 17 is an end view of a wire rope having a tapered sleeve associated therewith in the manner of FIGS. 3, 15 and 16, the center strand of the rope made up of a multiplicity of individual wires, with the outer peripheral strands likewise made up of a plurality of individual wires.

FIG. 17

The purpose of the showing of FIG. 17 is to illustrate a wire rope structure employed in the place of the individual wire strand constructions of the previously described Figures. That is, the strand element or cable employed in the collars of the structures previously described need not be a single center wire surrounded by individual peripheral wires. Alternatively, the straight center member (here designated 38) may be itself a strand of a multiplicity of wires and each of the wrap peripheral elements (here designated 39) may be elements of a multiplicity of individual wires. The tapered sleeve 40, then, is slid over the periphery of the inner strand 38, separating and dividing apart, somewhat, the outer wraparound strand elements 39. It should be understood that sleeves of the type shown in FIGS. 15 and 16 may be employed in place of the monolithic sleeve 40 of FIG. 17 to obtain compression upon the interior strand element 38 and positive engagement therewith as has been described with respect to FIGS. 15 and 16. Sleeve 40 has the same characteristics as to sleeves 13, 33 and 36 with respect to taper and length (same as the collar passageway taper end preferably seven times the strand diameter).

Two publications showing wire rope, cables and strands of various configurations, as well as conventional methods of socketing and swedging of end connections or swedging thereof are:
(1) Bethlehem Wire Rope For Bridges, Towers Aerial Tramways, And Structures, Catalog 2277-A of Bethlehem Steel, 96 pages; and (2) Cable Roof Structures, Bethlehem Steel, February, 1968, 95 pages.

Both of these publications give cable data for various type cable structures, as well as showing conventional fittings for use with cables, as well. Information with respect to strands of the type illustrated in FIGS. 1-5, 15 and 16, including some specifically useable is given in the September, 1968 publication of Armco Steel entitled "Tufwire Products For Prestressed Concrete", including the physical properties of seven wire strands specifically here applicable, that is, 270 grade and 250 grade.

Figure 18:
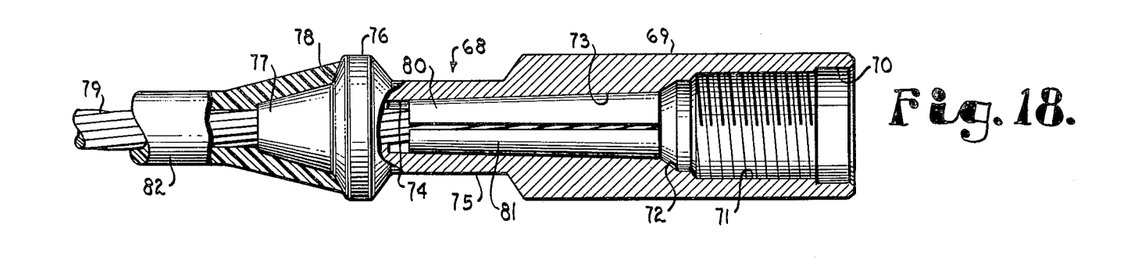
FIG. 18 is a side, partly sectional view of a box type collar mounted on a cable or strand which is wedged thereinto by wedge members gripping the outside surface of the cable or strand.
Figure 19:
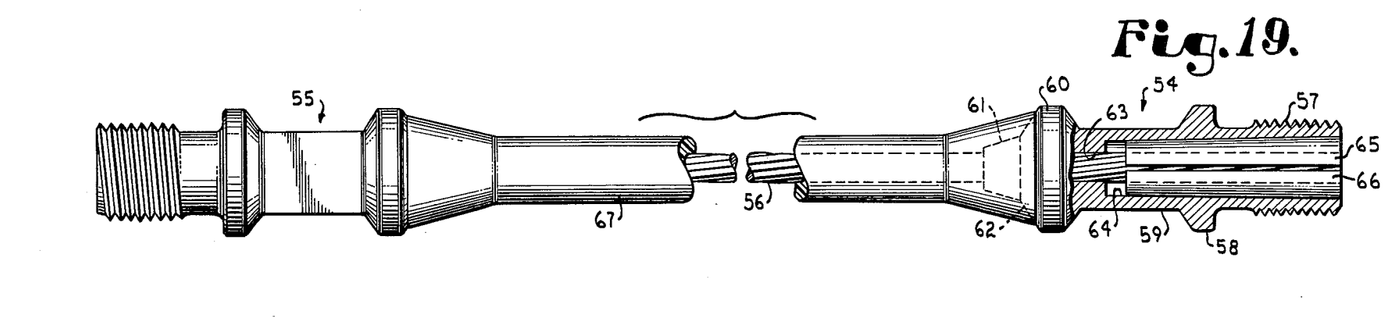
FIG. 19 is a side, partly sectional view of two pin type collars fixed on the respective ends of a cable or strand by wedging members gripping the outside surface of the strand or cable.
Figure 20:
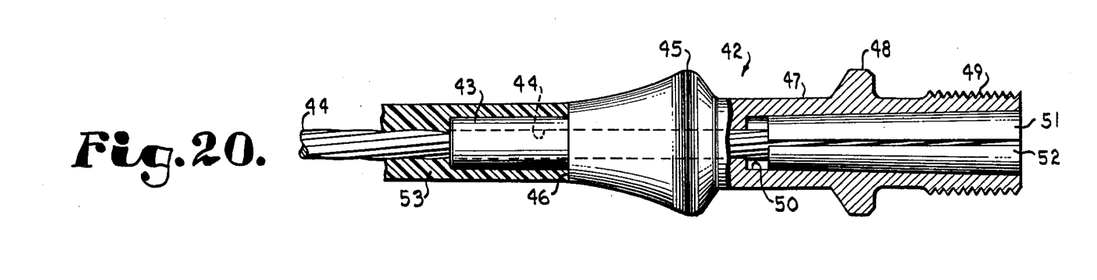
FIG. 20 is a side, partly sectional view of a collar member engaging the end of a strand or cable by gripping wedge elements on the external surface of the strand or cable, the collar structure of this Figure being essentially the same as that of FIG. 19, but with a different inboard wrapover portion like the wrapover portion of the collars of FIGS. 1-5, inclusive.

FIGS. 18-20, INCLUSIVE

Referring first to FIG. 20, therein is shown a pin type collar or collar element adapted to receive the end of a cable or strand substantially in the manner of the collars described in FIGS. 1, 3 and 5. The difference lies in the use of wedging elements primarily gripping the outside of the cable or strand, rather the use of a tapered sleeve which is inserted within the strand element in the manner previously described.

In the construction of FIG. 20, the cable or strand 41, at one end thereof, is received and wedged in a collar element generally designated 42. Collar 42 has an inboard cylindrical sleeve 43, through which passes cylindrical passageway 44. Outwardly tapered shoulder portion 45 makes an inboard shoulder 46 with sleeve 43. Wrench flat portion 47 has outboard thereof flange ring 48, with externally threaded end length 49 therepast. Passageway 44 extends through outwardly tapered shoulder 45 and into a greater diameter, tapered passageway 50 which, in the collar 42 shown, extends from within the wrench portion 47 out the outboard end of the collar. A pair of wedge elements 51 and 52, preferably of one of the constructions seen on FIGS. 21-23, inclusive or 24-27, inclusive, are gripped on the end of cable 41 and wedged tightly thereagainst within the tapered passageway portion 50. A compression sheath of the character previously described is shown at 53 wrapped over the entire length of strand 41 between collar elements 42 and also wrapped over sleeve 43, up to and abutting the shoulder 46.

Once again, the external configuration of the right hand portion of collar 42 is the same or substantially the same as the external configuration of a conventional sucker rod pin end.

The assembly of the sucker rod construction of FIG. 20 is as previously described with respect to FIGS. 1 and 2. That is, the end of cable 41 is thrust through the passages in collar 42 past the outboard end thereof (right end in FIG. 20) so that the wedges 51 and 52 can be applied thereto. Once this is done, the cable is pulled to the left in the view of FIG. 20 to wedge the end of the cable in the tapered passageway portion 50 with the wedge elements compressing against the outer wire elements of the strand or cable. At the other end of the strand or cable 41 a like pin type collar to collar 42 is employed or a box end collar as seen in FIG. 18, to be described.

The two collars, with the cable seized therein at the ends thereof, are put into a jig or suitable device to tension the cable sufficiently to at least fully straighten the cable or place it under substantial tension, such as approximately 50 percent of the absolute strength of the cable or strand. At this juncture, the compression sheath is wrapped thereon, comprising a fiberglass filament, strand or roving wet or impregnated with suitable plastic resin. The wrap is made along the entire length of the cable and on a portion of the inboard ends of the two collars gripping the ends of the cable. Once the wrap is made, the sucker rod assembly is maintained under the preset tension until the compression sheath is completely cured and set. Upon release from the jig or tensioning device, the sucker rod is ready for use and application in a well.

FIG. 19 shows a sucker rod assembly having two pin end collars on the end of the cable. Wedging means are employed to wedge the cable in the collars analogous to that of FIG. 20, such as the devices in FIGS. 21–23, inclusive and 24–27, inclusive. This device differs from the pin type collar of FIG. 20 primarily with respect to the inboard structure on the collars over which the compression sheath is wound.

Collars 54 and 55 are wedged onto the end of cable or strand 56. The collars are alike and only the collar in the right hand side of the view of FIG. 19 will be described. On the outboard end of collar 54, there is provided an externally threaded portion 57 adapted to be engaged by a coupling construction of conventional type or of that type seen in FIGS. 6–10, inclusive, to be described. Flange 58 is positioned along the length of collar 54 inboard of end portion 57. Wrench flat length 59 extends from flange 58 to circumferentially enlarged ring portion 60. Inboard of ring 60 is frusto-conical extension 61. A tapered frusto-conical shoulder 62 is defined between extension 61 and ring 60. A cylindrical passageway 63 extends through extension 61 and ring 60, as well as part of wrench flat 59, leading outboard into enlarged opening 64 which tapers to an enlarged inner diameter in the right hand side of FIG. 19 or the outboard end of the sucker rod assembly. Wedge elements 65 and 66 grip the end of cable or strand 56 within passageway 64 in collar 54 in the manner described with respect to the cable or strand end grip with respect to FIG. 20.

The compression sheath 67 is wrapped the entire length of strand 56 between collars 54 and 55 and upon the extensions inboard of the collars as extensions 61 on collar 54. The wrap is taken up against the abutment surface or shoulder 62 of collar 54 and likewise on collar 55.

The method of manufacture of the sucker rod construction or assembly of FIG. 19 is like that previously described with respect to FIG. 20, FIGS. 1 and 2 and FIG. 5. That is, the ends of the strand or cable 56 are thrust through passageways 63 and 64 in collar 54 and the equivalent in collar 55 so as to extend beyond the outboard end of the collars. Wedging elements as at 65 and 66 are applied to the strand or cable end and forcibly pulled into the outboard passages (as at 64) of the collars to wedge the ends of the cable or strand in the collars. Thereafter the collar-cable assembly is put under the desired degree of tension in a jig or like structure. With the tensioned strand or cable seized at its ends in the collars 54 and 55, the compression sheath is wrapped onto the entire length of the strand cable between the collars and over the collar inboard extensions as shown. Once the sheath has cured or set, with the cable under tension between the collars, the sucker rod assembly is removed from the jig and available for use.

FIG. 18 shows a box type collar of structure analogous to the collar of FIG. 19 where wedging elements are employed to secure the cable or strand ends in the collars. Collar 68, generally designated, has outboard body portion 69 with opening 70 into the outboard end thereof which internally threaded at 71 for threaded engagement with the pin type collar or collars previously described. The internal diameter of the passageway reduces at 72, leading into a tapered opening or passageway 73, which connects to cylindrical passage 74, which extends through the balance of the inboard portion of the collar.

The external structure of collar 68 has wrench flat portion 75, greater diameter flange portion 76 and frusto-conical extension 77 on the latter with shoulder 78 defined there between. Passageway 74 extends through flange 76 and extension 77 to receive therethrough cable or strand 79. Wedge elements 80 and 81 grip the strand or cable end in tapered passageway 73. Compression wrap 82, of resin-reinforced fiberglass filament, strand or roving, is wound on the entire length of the cable or strand and on extension 77 up to and abutting against shoulder 78. The collar on the other end of strand 79 would typically be a pin type as seen in FIG. 19, not FIG. 20. The inboard end structure of the collar opposite collar 68 should be the same so the wrap will be symmetrical on the inboard ends of the opposed collars (of the compression sheath 67).

The process of assembly and manufacture of the sucker rod assembly of FIG. 18 will not be again described as it is substantially the same as described with respect to FIGS. 19 and 20.

It is feasible to use wedging elements in conjunction with sleeve wedging members like element 13 of FIG. 1 where the strand has a center wire or wire cluster as in FIG. 3 or 17. However, when the center strand wire covering element of FIG. 1, FIG. 15 or FIG. 16 is employed (or FIG. 17), the use of the external wedging element is not necessary. The external wedging elements of FIGS. 18–20, inclusive and FIGS. 21–27, inclusive are typically employed only when there is no center strand wire or wire cluster available for use of an internal wedging element of the types described. Use of both internal and external wedging elements, additionally, tends to make the collar structure weak because of the necessity of larger passageways and openings. Generally speaking, the use of an internal wedging element in the strand permits a lesser internal diameter passageway through the collar for a given size strand or cable than the use of the external wedging elements as seen in FIGS. 18–20. The strand engaging means of FIGS. 1–3, inclusive gives greater gripping power than the devices of FIGS. 18–20, inclusive with no chance of the strand turning in the collar.

FIGS. 21–27, INCLUSIVE

In these Figures, tapering wedge elements 83 and 84 are illustrated. The inner surfaces of the wedge elements, concave, are provided with spiral groovings as at 85 in wedge element 83 where the pitch of the spiral is preferably the same as the strand cable to be gripped therewithin.

In the wedge element construction of FIGS. 24–27, inclusive, elements 86 and 87 are tapered half pieces adapted to grip the outer surface of a strand or cable. Before the elements are split, they are internally threaded and then the internally theaded passageway is reamed to remove the tops of the threads. The remaining threads, as at 88 in element 86 serve as serrations to grip the cable or strand.

Figure 21:
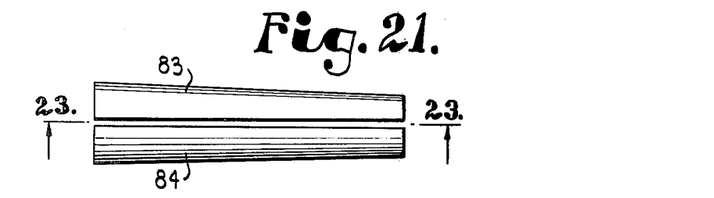
FIG. 21 is a side view of two wedging elements used to grip the outside surface of the cable or strand.
Figure 22:
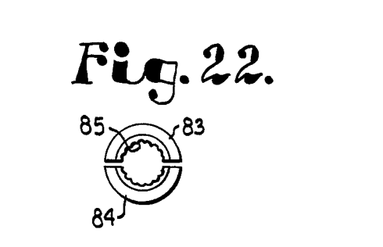
FIG. 22 is an end view (looking from the left to the right in the view of FIG. 21) of the wedges of FIG. 21.
Figure 23:
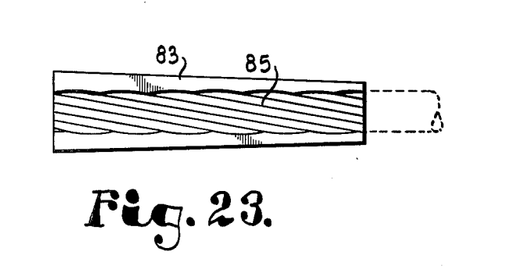
FIG. 23 is a veiw taken along the line 23—23 of FIG. 21 in the direction of the arrows.
Figure 24:
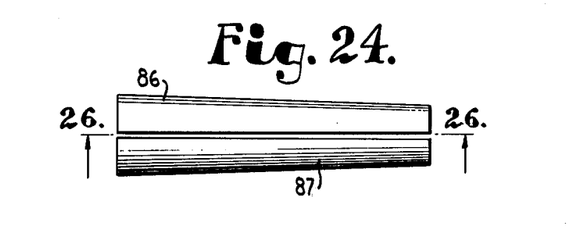
FIG. 24 is a side view of two wedging elements adapted to grip the outside surface of a cable or strand.
Figure 25:
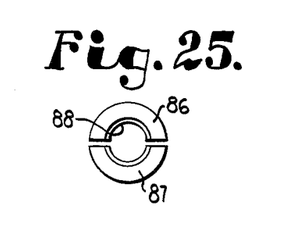
FIG. 25 is an end view of the elements of FIG. 24 looking to the right from the left hand side of the view of FIG. 24.
Figure 26:
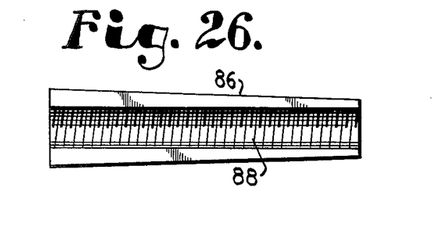
FIG. 26 is a view taken along the line 26—26 of FIG. 24 in the direction of the arrows.
Figure 27:
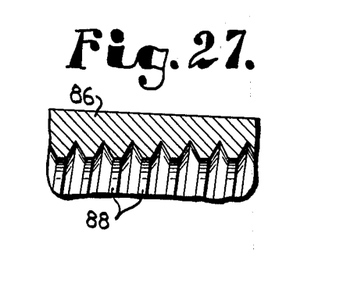
FIG. 27 is an enlarged fragmentary view of the threading structure of the wedges of FIGS. 24-26, inclusive showing how the internal sharp edges of the threads are cut or reamed off.

In the case of the wedging elements of both FIGS. 21–23, inclusive and FIGS. 24–27, inclusive, preferably, the length of the wedging elements is at least 7 times the outer diameter of the cable to be gripped. Additionally, the taper of the outer, convex surfaces of the wedging elements should match the taper of the passageways in which the wedging elements are to be received.

FIGS. 6–10, INCLUSIVE

Referring to these Figures, therein is shown the elements and assembly of an improved coupling particularly adapted for use with the sucker rod assemblies previously described. The combined use of the subject sucker rod assemblies and coupling are directed to the problem of electrical conductivity in the sucker rod chain. A first goal is to prevent conductance between the sucker rod assemblies in the chain of rods in the well bore and also between the elements of the sucker rods. Secondly, it is desired to minimize conductive contact between the elements of the sucker rod chain and the well casing or well hole.

In the sucker rod assemblies previously described and illustrated, it has been seen that the entire length of the elongate metallic element between the metal collars has been sheathed in non-conductive material, specifically, a wound fiberglass element reinforced by and adhered to itself by a plastic resin. This compression sheath not only covers the entire cable, but the opposed adjacent portions of the collars themselves on the ends of the elongate metallic element, strand or cable. This leaves exposed the ends of the metal collars seized on the strands or cables. Where there is a male-female connection of one collar element to another (for example, the collar of FIG. 18 to the collar of FIG. 19 or the collar of FIG. 1 to FIG. 5) then there is metal to metal contact between the ends of the collars and thus through the entire sucker rod chain. Yet further, the entire collar zone is metallic with respect to contact with the well or casing.

In the use of a conventional metal coupling between two pin type sucker rod ends, the entire external metal surface of the coupling itself is able to contact the well bore or casing. It thus acts as a conductive element between the collars or end pieces of a sucker rod chain and also is a metallic surfaced element able to directly contact the well bore or casing.

The subject coupling of FIGS. 6–10, inclusive has both a non-conductive element spacing apart the ends of the metal portions of the sucker rods being connected and a nonconductive sheathing for the entire outer surface of the coupling itself. The required metal elements for threaded connection to the pin type collar ends of the sucker rod elements are joined together by the non-conductive element and sheath in insulating fashion as will be described, thus fully accomplishing the goals noted with respect to control of electrical conductivity insofar as possible.

Referring, then, to FIGS. 6–10, inclusive, at 89 is generally designated the central element of the coupling or coupling assembly. Greater diameter cylindrical, central flange 89a has axially formed integrally therewith externally threaded cylindrical extensions 89b and 89c. Center member or plug 89 is conveniently formed of glass fiber reinforced plastic. As may be seen in FIG. 8, the center ends of the extensions or portions 89b and 89c are relieved as at 89d or countersunk. The latter feature permits the plug 89 to act as an elastic stop nut in use when the pin ends of the sucker rod collars abut thereagainst as will be described. Alternatively the plug may be of nylon or other more compressible insulating material. Additionally the recesses may be serrated as seen at 89e to enhance the compressibility of the plug and the desired locking effect of the plug with respect to its thread engagement with sleeves 90, to be described.

The elements of the coupling which threadably engage with the externally threaded pin ends of the sucker rod collars comprise two internally threaded metal sleeves generally designated 90 having, preferably, knurled or patterned external surfaces for adhesion purposes. The outer diameters of sleeves 90 taper centrally from a lesser outer diameter at the outboard ends 91 to a greater outer diameter at their inboard ends 92. Accordingly, the external configuration of the sleeves is frusto-conical with the bases of the cones toward the center. The sleeves 90 are hollow centrally, with an internally threaded passageway 93 extending centrally outwardly within the sleeves, the passageways enlarged as at 93a and chamfered as at 93b for entry of the sucker rod pin ends thereinto.

The threads on plug extensions 89b and 89c run in the same direction, as illustrated and the inboard ends of sleeves 90 thread on these portions, abutting centrally against the center flange 89a of the plug. The purpose of the central insulating plug is not, basically, to provide any structural strength. Rather, its purposes are to insulate the two steel sleeves 90 from one another and also align them for the wrapping process to be described. Yet further, as noted, when the sucker rod male ends are threaded into the steel sleeves 90, and they abut against the plastic plug ends, there is a locknut effect.

Figures 7, 8, 9:
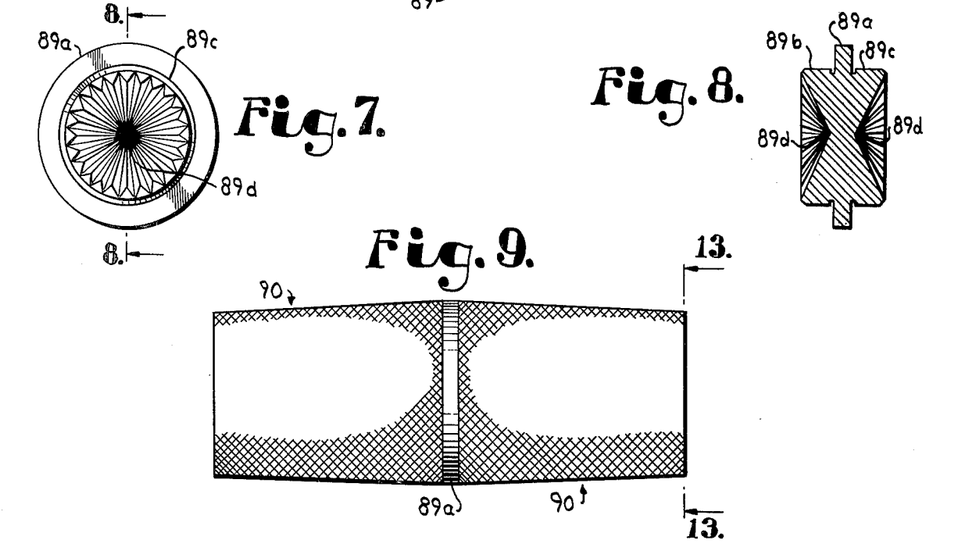
FIG. 7 is a view taken along the line 7—7 of FIG. 6 in the direction of the arrows.
FIG. 8 is a view taken along the line 8—8 of FIG. 7 in the direction of the arrows.
FIG. 9 is a side view of the elements of FIG. 6 assembled prior to wrapping to complete the coupling construction.
Figure 10:
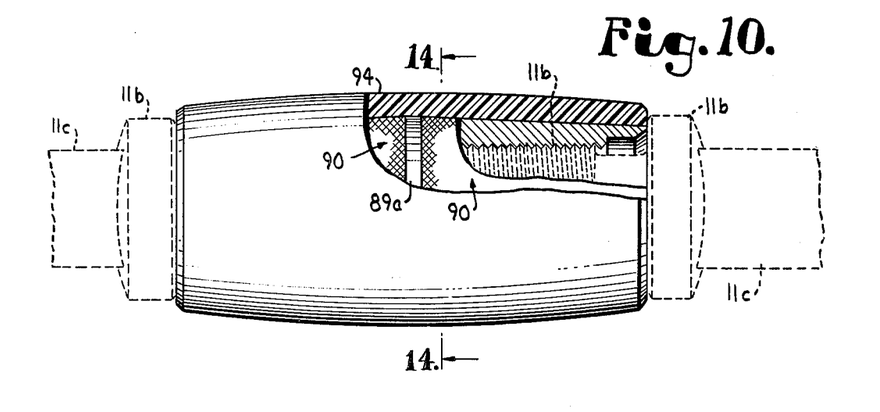
FIG. 10 is a side, partly sectioned view of the assembly of FIG. 9 having the polyester resin reinforced fiberglass fabric sheath wrap thereon and cured, the device also shown mated with the male or pin ends of two sucker rods.
Figure 11:
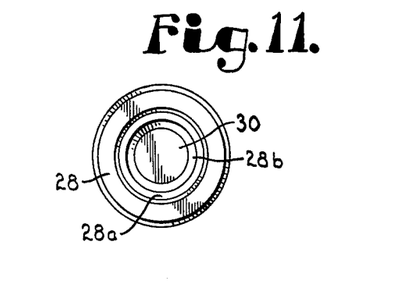
FIG. 11 is a view taken along the line 11—11 of FIG. 5 in the direction of the arrows.
Figure 12:
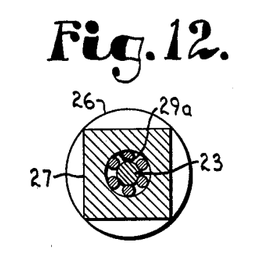
FIG. 12 is a view taken along the line 12—12 of FIG. 5 in the direction of the arrows.
Figure 13:
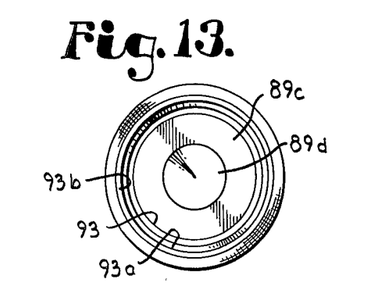
FIG. 13 is a view taken along the line 13—13 of FIG. 9 in the direction of the arrows.
Figure 14:
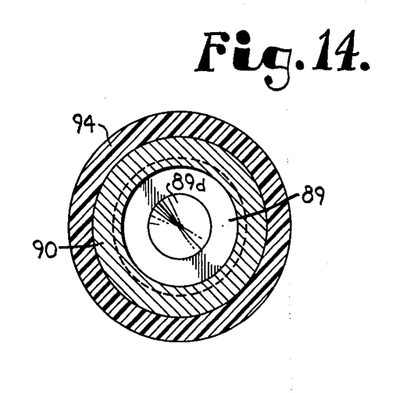
FIG. 14 is a view taken along the line 14—14 of FIG. 10 in the direction of the arrows.

Once the internal coupling elements of plug and paired sleeves (89 and 90) is accomplished as in FIG. 9 by threading the sleeves onto the plug extensions 89b and 89c, the entire assembly is wrapped with a multiplicity of layers of fiberglass fabric impregnated with polyester resin or other suitable plastic. This wrap adheres, when cured or set up, to the outwardly tapered, knurled steel surfaces of sleeves 90 and, centrally, to the external surface of flange 89a. The wrap is seen in FIG. 10 and numbered 94. Alternatively, the construction of FIG. 9 may be wrapped from end to end with a fiberglass filament, strand or roving impregnated with a suitable resin to give the protective sheath 94. The purpose of the sheath is two fold, specifically, first to integrally connect and structurally bond to the steel sleeves 90, thus fusing with them into a unitary structure and, secondly to overlie the entire outside metal surfaces of the coupling elements 90 and electrically insulate them from the well bore and well casing.

FIG. 10 shows two pin type collar elements of the structure seen in FIGS. 1 and 2 threaded into ends of the sleeve 90 with the shoulder elements 11b abutting against the outboard ends of sleeves 90 and the wrap 94. The outboard ends of the pin connections (within the sleeves in the view of FIG. 10) abut against and compress the threaded extensions 89b and 89c of plug 89 and their end serrations.

WRAPPING DETAILS

The strands or cables of the subject improvement may be wound with glass fiber strands or rovings of conventional type. The Patent to Case "Textile Fiber Winder", U.S. Pat. No. 2,955,772 issued Oct. 11, 1960 shows textile glass fiber strands formed by pulling 204 glass fibers from a platinum bushing. Also see Carlson et al "Textile Fiber Winder" U.S. Pat. No. 3,279,709 issued Oct. 18, 1966. Glass fiber roving is commonly made by simultaneously winding a number of strands in parallel on a rotating mandrel. Frequently a roving contains 60 strands, but it may have a greater or lesser number. A suitable roving production method and apparatus are seen in Hickman U.S. Pat. Nos. 3,383,851 "Method Of Producing Roving" issued May 21, 1968 and 3,545,192 "Apparatus For Winding Roving" issued Dec. 8, 1970.

Any conventional resin of phenolic, epoxy or polyester character may be employed with the strand or roving in winding on the cable or strand of the subject sucker rod. One specific example of such is a thermosetting isopthalic polyester resin catalyzed with methylethylketone peroxide. In winding the strand and collar or fitting portions of the subject invention, various suitable methods may be employed. Thus, the mandrel supporting the sucker rod therebetween may be rotated with the glass strand or roving feed traversed. Alternatively, the mandrel carrying the cable may be traversed with the glass strand or roving rotating. Further, the mandrel may be stationary with the glass strand or roving feed rotated and traversed. Other procedures may further be employed if desired. Typically, the wrap is at a rate of 10 to 180 feet per minute with the smaller the diameter of the strand or roving the slower the speed.

As previously mentioned, the tension on the strand or cable of the sucker rod assembly may be minimum (merely sufficient to take out any catenary droop therein) or maximum, which is a substantial proportion or fraction of the minimum breaking strength of the strand. As an example of a safe loading of a specific strand, the following is noted.

Armco Steel Corporation (7000 Roberts Street, Kansas City, Missouri 64125) produces a Tufwire Strand of 250 grade with 250,000 PSI ultimate tensile strength. This strand is of the configuration and number of wires seen in FIGS. 3 and 4. A Tufwire strand of 250 grade with a nominal diameter of ¼ inch has a weight per 1,000 feet in pounds of 122.12. Its nominal area in square inches is 0.036. Minimum breaking strength in pounds is 9,000. Minimum load with 1 percent extension in pounds is 7,650. The tension load, 70 percent minimum breaking strength, in pounds is 6,300. To calculate a safe prestress load, one multiplies the nominal area of 0.036 square inches times the 250,000 PSI tensile strength to obtain the minimum breaking strength of 9,000 pounds. A safe load, then, would be one half of that, or 4,500 pounds. The quarter inch nominal diameter Tufwire strand of 250 grade could safely be preloaded and prestressed to that level before wrapping. Substantially more preloading or stressing (more than 25 percent more) is not desired. Preloading or stressing below the noted calculation is not objectionable.

If the tensioning (pretensioning) of the strand or cable before wrapping is minimum, then the adherence of the wrap to the individual wires of the strand operates as resistance to stretch of the strand up to the strength limit of the attachment. If the pretensioning is at a higher or maximum level, then the strength of the attachment of the wrap to the individual wires of the strand helps in any overload condition.

Detailed values of physical properties of Armco high strength Tufwire strands of 270 grade and 250 grade for nominal diameters in inches of 250 (¼, 5/16, ⅜, 7/16 and ½) and 270 (⅜, 7/16, ½ and 0.600) are given in the 1968 Armco Steel Corporation brochure "Tufwire Products For Prestressed Concrete". These two strands are specific examples of strands (at various diameters) useful in the subject invention. Other strands of other manufacturers may additionally be used.

The provision of the inboard extensions (19 and 43, for example) over which the fiberglass-resin wrap is made prevents motion and working of the cable and wrap thereon with respect to the collar at the juncture of the cable and collar fitting. The form of extension employed in FIGS. 3, 5 and 20 is much preferable to that of FIGS. 18 and 19 because the metal working surface with respect to enlarged portions 11d, 26 and 45 is available during installation and pulling operations on the sucker rods. In the case of FIGS. 18 and 19, this work must be done against the wrap surface, which, under certain circumstances could damage such. Nevertheless, the tapered extension of FIGS. 18 and 19 may be employed to give the transition between the cable and the collar with respect to the wrap overlying both.

The new sucker rods and couplings thus have the following desirable characteristics:
(1) Do not stretch, fatigue or break while operating under safe load conditions;
(2) Two times lighter in weight than conventional structures;
(3) Ability to with stand corrosive fatigue longer;
(4) Will not support electrolytic action;
(5) Stress-free with higher flexibility operating under high stress conditions;
(6) Better than 2½ times less the power cost required than for API standard rod;
(7) The motor engine drive, for the pumping unit required, is approximately ½ the size of that required for API standard sucker rod use;
(8) No special installation tooling is required and will meet API Standards 11B and Supplements thereto.

SAFE WORKING LOADS

The following calculations determine the weight and safe working loads for composite steel strand (Armco Tufwire Strand) and fiberglass filament wound polyester reinforced plastic resin sucker rods of ⅝ inch, ¾ inch and ⅞ inch diameters based upon tensile strengths of 250,000 to 270,000 PSI for the steel strand and 280,000 PSI for the fiberglass filament and resin sheath. In the below "In. 2" means "square inches" and "In. 3" means "cubic inches".

⅝ INCH DIAMETER SUCKER ROD (1) ⅝ In. Outside Diameter Sheath = .3067 In. 2 Area
    Less 5/16 In. Diameter Strand = .0580 In. 2 Area
                                                   .2487 In. 2 Area (2) Wt.=(0.2487 In. 2 Area)(12 In./Ft.)=2.98 In. 3/Ft.
    (2.98 In. 3/Ft.)(0.075 Lbs./In.3)=0.224 Lbs./Ft.
    (0.224 Lbs./Ft.)(24.208 Ft.)=5.418 Lbs.
(3) Safe Compression Load of Sheath=(0.2487 In. 2 Area)(32,500 PSI)=8.083 Lbs. (see (4) below).
(4) Since the safe minimum load for Armco 250 Grade Tufwire is 70 percent of the minimum breaking strength [or (250,000 PSI)(0.058 In. 2 Area)=14,500 Lbs., (14,500 Lbs.)(0.70)=10,150 Lbs.] and the safe minimum tensile strength for reinforced fiberglass is divided by a factor of 8.6 (or 280,000 PSI divided by 8.6=32,558 PSI) then the safe working load (sheath) is (32,558 PSI)(0.2487 In. 2 Area)=8,097 Lbs. Therefore it is safe to stress the 5/16 diameter strand to 8,000 Lbs. for the ⅝ In. diameter composite sucker rod design before wrapping.

¾ INCH DIAMETER SUCKER ROD

| (1) ¾ In. Outside Diameter Sheath | = | .4418 In. 2 Area |
|---|---|---|
| Less ⅜ In. Diameter Strand | = | .0800 In. 2 Area |
| | | .3618 In. 2 Area |

(2) Wt.=(0.3618 In. 2 Area)(12 In./Ft.)=4.34 In. 3/Ft. (4.34 In. 3/Ft.)(0.075 Lbs./In. 3)=0.326 Lbs./Ft. (0.326 Lbs./Ft.)(24.208 Ft.)=7.88 Lbs.

(3) Safe Compression Load of Sheath=(0.3618 In. 2 Area)(32,500 PSI)=11,758 Lbs. (see (4) below).

(4) Since the safe minimum load for Armco 250 grade Tufwire is 70 percent of the minimum breaking strength [or (250,000 PSI)(0.080 In. 2 Area)=20,000 Lbs. (20,000 Lbs.)(0.70)=14,000 Lbs.] and the safe minimum tensile strength for reinforced fiberglass is divided by a factor of 8.6 [or 280,000 PSI divided by 8.6=32,558 PSI] then the safe working load (sheath)=(32,558 PSI)(0.3618 In. 2 Area)=11,779 Lbs. Therefore it is safe to stress ⅜ diameter strand to 11,750 Lbs. for the ¾ In. diameter composite sucker rod design before wrapping.

⅞ INCH DIAMETER SUCKER ROD

| (1) ⅞ In. Outside Diameter Sheath | = | .6013 In. 2 Area |
|---|---|---|
| Less ⅜ Diameter Strand Area | = | .0850 In. 2 Area |
| | | .516 In. 2 Area |

(2) Wt.=(0.516 In. 2 Area)(12 In./Ft.)=6.15 In. 3/Ft. (6.16 In. 3/Ft. ((0.075 Lbs./In.3)=0.462 Lbs./Ft. (0.462 Lbs./Ft.)(24.104 Ft.)=11.14 Lbs.

(3) Safe Compression Load of Sheath=(0.516 In. 2 Area) (32,500 PSI)=16,770 Lbs. (see (4) below).

(4) Since the safe minimum load for Armco 270 grade Tufwire is 70 percent of the minimum breaking strength [or (270,000 PSI)(0.085)=22,950 Lbs. (22,950 Lbs.)(0.70)=16,065 Lbs.] and the safe minimum tensile strength for the reinforced fiberglass is divided by a factor of 8.6 [or 280,000 PSI divided by 8.6=32,558 PSI] then the safe working load (sheath)=(32,558 PSI)(0.516 In. 2 Area)=16,780 Lbs. Therefore it is safe to stress the ⅜ diameter 270 strand to 16,000 Lbs. for the ⅞ In. diameter composite sucker rod design before wrapping.

BONDING OF GLASS FIBER TO STRAND

In the said referenced calculations, the adherence factor or bonding characteristics of the fiberglass-resin sheath to the steel strand was not taken into account.

Since the rod end fittings will place the filament wound fiberglass reinforced plastic resin sheath in compression, upon release of the tension in the steel strand after the sheath has been applied and cured, it is apparent that the composite sucker rod design will not buckle, due to the fact that the bond between the fiberglass sheath and the steel strand is preventing it.

This bond or force is classified as shear or interlaminar stress and can be safely stated at 2,000 PSI. Thus, a 5/16 diameter Armco Tufwire strand is composed of 6 individual outer wires wrapped or spiraled around 1 central straight wire having the same diameter (FIG. 4) as the outer wires.

The area of contact between the fiberglass sheath and the said strand is determined as follows:

Single wire -0.109 In. Diameter or 0.3436 In. Circumf. Since only 1/6 or 60 degrees of the surface of each individual outer wire is exposed or makes contact with the fiberglass sheath, then 0.3436 In. Cir. divided by 6=0.057 In. (Area of contact for each individual wire). Since there are 6 wires, then the total area of contact is: (0.057 In.) (6)=0.3436 In.

The calculated shear or interlaminar stress or bond between the sheath and steel strand is as follows:

The total sheath to strand contact length is 24 Ft. 2 17/32 In. or 209.531 In. then (290.531 In.) (0.3436 In.)=99.826 In. 2. Then (99.826 In.2) (2000 PSI)=199,653 Lbs. total bonding strength.

Based upon the above calculations, it can be readily seen that the strand need not be fully pre-tensioned or stretched before applying the fiberglass and resin sheath to obtain a sucker rod having all the desired characteristics of the pre-tensioned sucker rod. The only stretch required is that necessary to set the tapered wedges in the end pins (FIG. 1) and to hold the strand straight, without sagging during the winding of the fiberglass and resin sheath upon the said strand.

In other words, when a string of "non-tensioned" sucker rods are placed in an oil well, the bond between the sheath and steel strand will prevent the composite rod design from longitudinal stresses from an approximate zero stress to maximum tension, provided the string is not over-loaded or over-flexed to break the bond between the sheath and strand (2,000 Lbs. per square inch).

Also, the said bond will prevent corrosion and protect the strand from corrosive, oil well fluids.

COUPLING FORCES

Since it is desirable to use the subject nonconductive sucker rod coupling in place of the strandard steel type coupling presently used in the industry, it is apparent that the new coupling must be capable of with standing the inherent stresses and loads encountered during oil well pumping. As far as can be determined, there are no mathematical formulae available determining the stresses, loads and other physical properties of the new non-conductive composite coupling.

Therefore, certain assumptions must be made which appear logical for use in obtaining close approximations of the desired values, prior to actual laboratory and field testing.

Based upon typical physical properties (hydrostatic strength) of reinforced plastic pipe having wall thicknesses comparable to the wall thickness outside the threaded tapered steel inserts of the coupling, it can be determined that the new coupling will have the following typical properties.

The estimated hydrostatic or hoop strength of a ⅞ Inch diameter coupling having an OD of 1¼ inches and an average fiberglass reinforced plastic thickness of 5/32 inch maximum and ⅛ inch minimum will be as follows:

Average OD of the tapered threaded sleeve=1.187+1.250=2.437 divided by 2=1.218 Diameter.

(1.218 Diameter) (3.1416)=3.828 In. Circumf.

(3.828 Circ.) (1.75=6.7 In. 2 Area

Hydrostatic strength at burst=(32,500 PSI average fiberglass tensile strength) divided by 6.7 In. 2=4850 PSI.

(4850 PSI) (0.70 safety factor)=3395 PSI shear strength
=(3395 PSI) (6.7 In. 2)=22,746 Lbs.

The estimated shear strength for the composite design is determined as follows (using a shear load of 2,000 PSI, estimated):

(6.7 In. 2 Area) (2,000 Lbs./In. 2)=13,400 Lbs. The maximum allowable working stress for ⅝ Inch sucker rods is 40,000 PSI (API) and maximum load is (0.3068 In. 2 Area Rod) (40,000 PSI)=12,272 Lbs.

(Note): The 40,000 PSI working stress is for high tensile strength steel 115,000 PSI to 130,000 PSI (API).

If we can assume that the 2,000 Lbs. per square inch factor is reasonably correct, then the 13,400 Lbs. shear strength calculated above will be sufficient for the coupling design with ample safety. When other stresses such as outward force is encountered, the calculation for hydrostatic strength becomes very important when the coupling is used with standard steel sucker rods.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown is the accompanying drawings is to be interpreted as illustrative and not in a limiting sense.

I claim:

1. A cable-collar assembly comprising, in combination:
    an elongate metallic element having two free ends,
    a first metal collar having a passageway therethrough of internal diameter close to the outer diameter of said element positioned on one of said element free ends, with the element in said passageway, which passageway closely encloses same,
    a second metal collar having a passageway therethrough of internal diameter close to the outer diameter of said element positioned on the other free end of said element, with the element within said passageway, which passageway closely encloses same,
    engaging means cooperating between each collar and said metallic element fixing said collars on said element closely adjacent the free ends thereof,
    each collar having associated therewith a hollow, inboard elongate extension, through which the metallic element passes in a continuation of said passageway, said extension opposing the inboard end of the other collar,
    said extensions circumferentially of lesser outer diameter than the outer diameter of the collar portion next thereto, whereby there is provided a first circumferential shoulder between the outer surface of said element and the inboard end of each extension and a second circumferential shoulder between the outer surface of each said extension and the inboard portions of the collars,
    the entire length of the metallic element between the inboard ends of the extensions up to and abutting the first shoulder, and the lengths of the extensions themselves up to and abutting the second shoulder, wrapped with a resin coated, fiberglass element to form an elongate, liquid-impervious sheath extending between the inboard ends of said collars and entirely overlying said extensions,
    said sheath integrally bonded to said element and collar extensions,
    the elongate metallic element between the collar engagements having been placed under sufficient pulling tension before, during and after the wrapping thereof to maintain the said metallic element taut, straight and at least somewhat stretched until substantial curing of the said sheath thereon, whereby, when the pulling tension is released upon said metallic element, the entire sheath is under longitudinal compression thereof between the said two shoulders, with the metallic element remaining under tension maintained by the sheath thereon.

2. A cable-collar assembly as in claim 1 wherein the said associated, hollow inboard extensions on the collars are cylindrical in form.

3. A cable-collar assembly as in claim 1 wherein the said associated, hollow inboard extensions on the collars are frusto-conical in form, enlarging outwardly toward the collars.

4. A cable-collar assembly as in claim 1 wherein the said associated, hollow inboard extensions on the collars are cylindrical in form and the elongate metallic element and extensions are both wrapped by said sheath to an outer diameter on the element and the extensions extending substantially up the full height of said second shoulder.

5. A cable-collar assembly as in claim 1 wherein the said associated, hollow, inboard extensions on the collars are frusto-conical in form, enlarging outwardly toward the collars and the said element and extensions are both wrapped by said sheath to an outer diameter greater than the outer diameter of the inboard portions of said extensions, whereby the outboardmost portions of said sheath flare in frusto-conical form up to said second shoulder.

6. A cable-collar assembly as in claim 5 wherein the extensions are not wrapped up to the full height of the second shoulder, but are wrapped substantially over and above the height of the first shoulder.

7. A cable-collar assembly as in claim 1 wherein the elongate metallic element was placed under a pulling tension of a significant percentage of the tensile strength of the elongate metallic element before, during and after the wrapping thereof, thereby to maintain the said metallic element taut, straight and substantially stretched until substantial curing of the said sheath thereon, whereby, when the said pulling tension was released upon said metallic element, the entire sheath is under substantial and extreme longitudinal compression thereof between the said two shoulders, with the metallic element remaining under a tension of a significant percentage of the tensile strength of the elongate metallic element maintained by the sheath thereon.

8. A cable-collar assembly as in claim 1 wherein the means cooperating between each collar and said metallic element comprising wedge members adapted to grip the external surface of the elongate metallic element and an enlarged, tapered portion of the collar passageway within which the said wedge elements are received and against which the said wedge elements set,
    said wedge member in each collar continuously gripping said element surface and set against said passageway portion by virtue of and maintaining the tension on said metallic element and compression on said sheath.

9. A cable-collar assembly as in claim 1 wherein the elongate metallic element comprises a strand made up of a straight core member having peripheral members wound thereon, and the means cooperating between each collar and said element comprises a hollow, tapered sleeve element engaging the core member of the strand and received inside the peripheral members of the strand and a tapered, enlarged portion of the collar passageway within which at least the peripheral members of the strand are wedged between the tapered sleeve element and the collar, each said sleeve element set in its wedging engagement between the collar and the strand elements by virtue of and maintaining the tension on said metallic element and compression on said sheath.

10. A cable-collar assembly as in claim 9 wherein the tapered sleeve element additionally grips the core member of the strand.

11. A cable-collar assembly as in claim 1 wherein the metallic element and the lengths of the extensions are wrapped with said resin coated fiberglass element in a helical winding.

12. A cable-collar assembly comprising, in combination:

an elongate metallic element having two free ends, a first metal collar having a passageway therethrough of internal diameter close to the outer diameter of said element positioned on one of said element free ends, with the element in said passageway, which passageway closely encloses same, a second metal collar having a passageway therethrough of internal diameter close to the outer diameter of said element positioned on the other free end of said element, with the element within said passageway, which passageway closely encloses same, engaging means cooperating between each collar and said metallic element fixing said collars on said element closely adjacent the free ends thereof, each collar having associated therewith a hollow, inboard elongate extension, through which the metallic element passes in a continuation of said passageway, said extension opposing the inboard end of the other collar, said extensions circumferentially of lesser outer diameter than the outer diameter of the collar portions next thereto, whereby there is provided a first circumferential shoulder between the outer surface of said element and the inboard end of each extension and a second circumferential shoulder between the outer surface of each said extension and the inboard portions of the collars, the entire length of the metallic element between the inboard ends of the extensions up to and abutting the first shoulder, and the lengths of the extensions themselves up to and abutting the second shoulder, wrapped with a resin coated, fiberglass element to form an elongate, liquid-impervious sheath extending between the inboard ends of said collars and entirely overlying said extensions, said sheath integrally bonded to said element and collar extensions, the elongate metallic element between the collar engagements having been placed under sufficient pulling tension before, during and after the wrapping thereof to set the engaging means fixing the collars on said element and maintain the said metallic element taut and straight until substantial curing of the said sheath thereon, whereby, when the pulling tension is released upon said metallic element, the said metallic element is maintained taut and substantially straight by the bond of said sheath with said element and collar extensions and the abutments of said sheath with said two shoulders and the collars are maintained fixed on said element thereby.

13. A cable-collar assembly as in claim 12 wherein the said associated, hollow inboard extensions on the collars are cylindrical in form.

14. A cable-collar assembly as in claim 12 wherein the said associated, hollow inboard extensions on the collars are frusto-conical in form, enlarging outwardly toward the collars.

15. A cable-collar assembly as in claim 12 wherein the said associated, hollow inboard extensions on the collars are cylindrical in form and the elongate metallic element and extensions are both wrapped by said sheath to an outer diameter on the element and the extensions extending substantially up the full height of said second shoulder.

16. A cable-collar assembly as in claim 12 wherein the said associated, hollow, inboard extensions on the collars are frusto-conical in form, enlarging outwardly toward the collars and the said element and extensions are both wrapped by said sheath to an outer diameter greater than the outer diameter of the inboard portions of said extensions, whereby the outboardmost portions of the said sheath flare in frusto-conical form up to said second shoulder.

17. A cable-collar assembly as in claim 16 wherein the extensions are not wrapped up to the full height of the second shoulder, but are wrapped substantially over and above the height of the first shoulder.

18. A cable-collar assembly as in claim 12 wherein the means cooperating between each collar and said metallic element comprises wedge members adapted to grip the external surface of the elongate metallic element and an enlarged, tapered portion of the collar passageway within which the said wedge elements are received and against which the said wedge elements set, said wedge members in each collar continuously gripping said element surface and set against said passageway portions by virtue of said sheath bonding to said element and extensions and abutment against said shoulders.

19. A cable-collar assembly as in claim 12 wherein the elongate metallic element comprises a strand made up of a straight core member having peripheral members wound thereon, and the means cooperating between each collar and said element comprises a hollow, tapered sleeve element engaging the core member of the strand and received inside the peripheral members of the strand and a tapered, enlarged portion of the collar passageway within which at least the peripheral members of the strand are wedged between the tapered sleeve element and the collar, each said sleeve element set in its wedging engagement between the collar and the strand elements by virtue of said sheath bonding to said element and extensions and abutment against said shoulders.

20. A cable-collar assembly as in claim 19 wherein the tapered sleeve element additionally grips the core member of the strand.

21. A cable-collar assembly as in claim 12 wherein the metallic element and the lengths of the extensions are wrapped with said resin coated fiberglass element in a helical winding.

22. A sucker rod assembly comprising, in combination:

an elongate metallic element having two free ends, first and second metal collars each having an external configuration for sucker rod use including outboardmost rod-to-rod connecting means, intermediate wrench flat portions and inboard, tapered, enlarged suspension shoulder means, said collars each having a passageway therethrough of internal diameter close to the outer diameter of said element and positioned on one of said element free ends, with the element in said passageway, which passageway closely encloses same, engaging means cooperating between each collar and said metallic element fixing said collars on said element closely adjacent the free ends thereof, each collar having associated therewith a hollow, inboard elongate extension, through which the metallic element passes in a continuation of said passageway, said extension opposing the inboard end of the other collar, said extensions circumferentially of lesser outer diameter than the outer diameter of the inboard ends of the tapered, enlarged suspension shoulder means next thereto, whereby there is provided a first circumferential shoulder between the outer surface of said element and the inboard end of each extension and a second circumferential shoulder between the outer surface of each said extension and the inboard portions of the said tapered enlarged suspension shoulder means, the entire length of the metallic element between the inboard ends of the extensions up to and abutting the first shoulder, and the lengths of the extensions themselves up to and abutting the second shoulder, wrapped with a resin coated, fiberglass element to form an elongate, liquid-impervious sheath extending between the inboard ends of said collars and entirely overlying said extensions, said sheath integrally bonded to said element and collar extensions, the wrap of the sheath on the element and extensions equal to the entire height of the second shoulder whereby the outer surface of the sheath flares into and is continuous with the inboard ends of the tapered, enlarged suspension shoulder means, the elongate metallic element between the collar engagements having been placed under sufficient pulling tension before, during and after the wrapping thereof to maintain the said metallic element taut, straight and at least somewhat stretched until substantial curing of the said sheath thereon, whereby, when the pulling tension is released upon said metallic element, the entire sheath is under longitudinal compression thereof between the said two shoulders, with the metallic element remaining under tension maintained by the sheath thereon.

23. A sucker rod assembly as in claim 22 wherein the said inboard elongate extensions on said collars are cylindrical in configuration, whereby the entire wrap on the element and extensions forms a sheath of uniform outer diameter in the entire length thereof.

24. A sucker rod assembly as in claim 22 wherein the outboardmost connecting means on one of said collars is an external, threaded pin-type connection, with the engaging means cooperating between said collar and said metallic element at least partially received within said pin-type connecting means.

25. A sucker rod assembly as in claim 22 wherein said outboardmost connecting means on one of said collars comprises an internally threaded box type connection, the said engaging means cooperating between said collar and said metallic element inboard of said box type connection.

26. A sucker rod assembly as in claim 22 wherein the metallic element and the lengths of the extensions are wrapped with said resin coated fiberglass element in a helical winding.

27. A sucker rod assembly comprising, in combination, an elongate metallic element having two free ends, first and second metal collars each having an external configuration in at least the outboard portions thereof for sucker rod use, including outboardmost rod-to-rod connecting means, intermediate wrench flat portions and an enlarged, inboard, circumferential abutment shoulder flange, said collars each having a passageway therethrough of internal diameter close to the outer diameter of said element and positioned on one of said element free ends, with the element in said passageway, which passageway closely encloses same, engaging means cooperating between each collar and said metallic element fixing said collars on said element closely adjacent the free ends thereof, each said collar having associated therewith a hollow, frusto-conical and outwardly enlarging inboardmost elongate extension positioned next to said abutment shoulder flange, through which the metallic element passes in a continuation of said passageway, and opposing the inboard end of the other collar, said extensions circumferentially of lesser outer diameter than the outer diameter of the shoulder flange next thereto, whereby there is provided a first circumferential shoulder between the outer surface of said element and the inboard end of each extension and, at said abutment shoulder flange, a second circumferential shoulder between the outboard surface of each said extension and the inboard portion of the said shoulder flange, the entire length of the metallic element between the inboard ends of the extensions up to and abutting the first shoulder, and the lengths of the extensions themselves up to and abutting the second shoulder, wrapped with a resin coated, fiberglass element to form an elongate, liquid-impervious sheath extending between the inboard ends of said collars and entirely overlying said extensions, said sheath integrally bonded to said element and collar extensions, the outboard most portions of said sheath forming a frusto-conical overlay on said extensions adapted to provide, with said circumferential shoulder flanges, outwardly tapered and enlarged suspension shoulder means for sucker rod handling, the elongate element between the collar engagement having been placed under sufficient pulling tension before, during and after the wrapping thereof to maintain the said metallic element taut, straight and at least somewhat stretched until substantial curing of the said sheath thereon, whereby, when the pulling tension is released upon said metallic element, the entire sheath is under longitudinal compression thereof between the said two shoulders, with the metallic element remaining under tension maintained by the sheath thereon.

28. A sucker rod assembly as in claim 27 wherein the metallic element and the lengths of the extensions are wrapped with said resin coated fiberglass element in a helical winding.

29. A coupling assembly for connecting together a pair of externally threaded cylindrical members comprising, in combination:
an integral, central plug of electrically insulating material made up of a cylindrical central flange of relatively greater outer diameter having a lesser outer diameter, cylindrical, externally threaded engaging portion extending axially outwardly from each side thereof,
a pair of internally threaded, hollow metal sleeves, each of frusto-conical shape,
one of said sleeves adapted to thread onto each engaging portion of said plug, with greater outer diameter inboard portions abutting and of substantially the same outer diameter as said plug flange tapering outwardly to lesser outer diameter outboard ends thereof,
the external surfaces of said sleeves patterned for adhesion purposes,
the said sleeves firmly threaded on the plug engaging portions with the larger diameter ends of the sleeves abutting against the sides of the central flange of the plug,
the entire circumferential periphery of the coupling assembly sheathed with a multiple layer, fiberglass element impregnated with resin, the resin bonded to the external surfaces of the sleeves and flange.

30. A coupling assembly as in claim 29 wherein the fiberglass element is a fiber coated with resin wrapped on the external surfaces of the sleeves and plug flange.

31. An assembly as in claim 29 wherein the fiberglass element comprises a multiplicity of wraps of fiberglass fabric impregnated with resin overlying the external surfaces of the sleeves and plug flange.

32. An assembly as in claim 29 wherein the plug is of fiberglass reinforced plastic.

33. A sucker rod-coupling assembly comprising, in combination:
a pair of sucker rod assemblies, each having:
an elongate metallic element having two free ends,
a first collar having a passageway therethrough positioned on one of said element free ends,
a second collar having a passageway therethrough positioned on the other free end of the element,
means cooperating between each collar and said metallic element fixing said collars on said element closely adjacent the free ends thereof,
the entire length of the element between the collars and a portion of the collars themselves wrapped with a resin coated, fiberglass element to form an elongate, liquid-impervious sheath extending between and partially overlying the said collars,
said sheath integrally bonded to said element and collars,
each of said collars having an externally threaded male extension on the end thereof away from said element adapted for engagement by one end of a coupling,
said two sucker rod assemblies connected to one another by a coupling assembly which threads onto the male extension of one collar of each sucker rod assembly,
said coupling assembly comprising, in combination:
an integral, central plug of electrically insulating material made up of a cylindrical central flange of relatively greater outer diameter having a lesser outer diameter, cylindrical, externally threaded engaging portion extending axially outwardly from each side thereof,
a pair of internally threaded, hollow metal sleeves, each of frusto-conical shape,
one of said sleeves adapted to thread onto each engaging portion of said plug, with greater outer diameter inboard portions abutting and of substantially the same outer diameter as said plug flange tapering outwardly to lesser outer diameter outboard ends thereof,
the external surfaces of said sleeves patterned for adhesion purposes,
the said sleeves firmly threaded on the plug engaging portions with the larger diameter ends of sleeves abutting against the sides of the central flange of the plug,
the entire circumferential periphery of the coupling assembly sheathed with a multiple layer, fiberglass element impregnated with resin, the resin bonded to the external surfaces of the sleeves and flange.

34. An assembly as in claim 33 wherein the adjacent portions of the sucker rod assembly collars within a given sucker rod assembly are of reduced diameter to receive a portion of the fiber wrapping thereon.

35. An assembly as in claim 33 wherein each elongate metallic element of each sucker rod assembly was placed under substantial tension between the collars thereof before the sheath was wrapped thereon.

36. An assembly as in claim 33 wherein the fiberglass element of the coupling assembly sheath is a fiber coated with resin wrapped on the external surfaces of the sleeves and plug flange.

37. An assembly as in claim 33 wherein the fiberglass element of the coupling assembly comprises a multiplicity of wraps of fiberglass fabric impregnated with resin overlying the external surfaces of the sleeves and plug flange.

38. An assembly as in claim 33 wherein the coupling assembly plug is of fiberglass reinforced plastic.

39. A coupling assembly for connecting together a pair of externally threaded cylindrical members comprising, in combination:
a pair of hollow metal sleeves, each of frusto-conical shape and internally threaded in at least a portion of the length thereof,
an integral, central plug of electrically insulating material comprising a cylindrical flange of outer diameter at least substantially equal to the greatest outer diameter of said sleeves,
means connecting said plug and the greater outer diameter ends of said sleeves into an integral structure wherein said flange, on each side thereof, abuts against the inboard ends of each said sleeve and closes off the passageway therethrough, the entire circumferential periphery of the coupling assembly sheathed with a multiple layer, strong, non-metallic element impregnated with resin, said sheath strongly and firmly bonded to the external surfaces of the sleeves and flange.

40. An assembly as in claim 39 wherein the non-metallic element comprises a multiplicity of wraps of fiberglass fabric impregnated with resin overlying the external surfaces of the sleeves and flange.

41. A coupling assembly as in claim 39 wherein the non-metallic element is a fiber coated with resin wrapped on the external surfaces of the sleeves and flange.

42. An assembly as in claim 39 wherein the flange is of fiberglass reinforced plastic.

43. A sucker rod-coupling assembly comprising, in combination:
   a pair of associated sucker rod assemblies, each having:
   an elongate metallic element having two free ends,
   a first collar having a passageway therethrough receiving therewithin and positioned on one of the element free ends,
   a second collar having a passageway therethrough receiving therewithin and positioned on the other free end of the element,
   means cooperating between the portion of each collar receiving said metallic element and said metallic element fixing said collars on said element closely adjacent to free ends thereof,
   the entire length of the element between the collars and a portion of the collars themselves wrapped with a resin coated, strong, non-metallic element to form a liquid-impervious sheath extending between and partially overlying said collars, said sheath strongly and integrally bonded to said element and the collar portions overlaid thereby,
   each of said collars having an externally threaded male extension on the end thereof away from said element adapted for engagement by one end of a coupling,
   said two sucker rod assemblies connected to one another by a coupling assembly which threads onto the male extension of one collar of each sucker rod assembly,
   said coupling assembly comprising, in combination:
   a pair of hollow metal sleeves, each of frusto-conical shape and internally threaded in at least a portion of the length thereof,
   an integral, central plug of electrically insulating material comprising a cylindrical flange of outer diameter at least substantially equal to the greatest outer diameter of said sleeves,
   means connecting said plug and the greater diameter ends of said sleeve into an integral structure wherein said flange, on each side thereof, abuts against the inboard ends of each said sleeve and closes off the passageway therethrough,
   the entire circumferential periphery of the coupling assembly sheathed with a multiple layer, strong, non-metallic element impregnated with resin, said sheath strongly and firmly bonded to the external surfaces of the sleeve and flange.

44. An assembly as in claim 43 wherein the adjacent portions of the sucker rod assembly collars within a given sucker rod assembly are of relatively reduced diameter, whereby to receive a portion of the non-metallic element wrapping thereon.

45. An assembly as in claim 43 wherein each elongate metallic element of each sucker rod assembly was placed under substantial tension between the collars thereof before the sheath was wrapped thereon.

46. An assembly as in claim 43 wherein the non-metallic element of the coupling assembly sheath is a fiber coated with resin wrapped on the external surfaces of the sleeves and flange.

47. An assembly as in claim 43 wherein the non-metallic element of the coupling assembly comprises a multiplicity of wraps of fiberglass fabric impregnated with resin overlying the external surfaces of the sleeves and flange.

48. An assembly as in claim 43 wherein the coupling assembly flange is of fiberglass reinforced plastic.

* * * * *